United States Patent
Guo et al.

(10) Patent No.: US 9,392,218 B2
(45) Date of Patent: Jul. 12, 2016

(54) IMAGE PROCESSING METHOD AND DEVICE

(71) Applicant: Huawei Technologies Co., Ltd., Shenzhen (CN)

(72) Inventors: Yanling Guo, Shenzhen (CN); Tian Wang, Beijing (CN); Dejun Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/972,222

(22) Filed: Dec. 17, 2015

(65) Prior Publication Data

US 2016/0105636 A1 Apr. 14, 2016

Related U.S. Application Data

(63) Continuation of application No. PCT/CN2014/070138, filed on Jan. 6, 2014.

(30) Foreign Application Priority Data

Aug. 19, 2013 (CN) .......................... 2013 1 0362321

(51) Int. Cl.
*H04N 7/14* (2006.01)
*H04N 7/15* (2006.01)
(Continued)

(52) U.S. Cl.
CPC .............. *H04N 7/142* (2013.01); *G06T 7/0051* (2013.01); *G06T 7/0081* (2013.01); *H04N 7/15* (2013.01); *H04N 19/172* (2014.11); *H04N 19/182* (2014.11); *H04N 19/186* (2014.11);
(Continued)

(58) Field of Classification Search
CPC combination set(s) only.
See application file for complete search history.

(56) References Cited

U.S. PATENT DOCUMENTS

2002/0051491 A1* 5/2002 Challapali .......... H04N 13/0059
375/240.2
2006/0056717 A1 3/2006 Cheung et al.
(Continued)

FOREIGN PATENT DOCUMENTS

EP 1134985 A1 9/2001
WO 0031981 A1 6/2000

OTHER PUBLICATIONS

Katsaggelos, A., et al., "MPEG-4 and Rate-Distortion-Based Shape-Coding Techniques," Proceedings of the IEEE, vol. 86, No. 6, Jun. 1998, pp. 1126-1154.
(Continued)

*Primary Examiner* — Joseph J Nguyen
*Assistant Examiner* — Phung-Hoang J. Nguyen
(74) *Attorney, Agent, or Firm* — Conley Rose, P.C.; Grant Rodolph; Adam J. Stegge (57) ABSTRACT

An image processing method may include collecting a video image and a depth map of an object; segmenting, using the depth map, a video image frame corresponding to the video image at a same moment to obtain a contour of a foreground image in the video image frame; performing, according to the contour of the foreground image, first encoding on pixels of a video image inside the contour of the foreground image in the video image frame and second encoding on pixels of a video image outside the contour in the video image frame, where an encoding rate of the first encoding is higher than an encoding rate of the second encoding. According to the embodiments of the present disclosure, an occupation rate of network bandwidth in a video image transmission process can be lowered.

11 Claims, 6 Drawing Sheets

(51) Int. Cl.
  *H04N 19/172*  (2014.01)
  *H04N 19/182*  (2014.01)
  *H04N 19/186*  (2014.01)
  *H04N 19/503*  (2014.01)
  *G06T 7/00*  (2006.01)

(52) U.S. Cl.
  CPC .... *H04N19/503* (2014.11); *G06T 2207/10024* (2013.01); *G06T 2207/10028* (2013.01); *G06T 2207/20144* (2013.01)

(56) References Cited

U.S. PATENT DOCUMENTS

| | | | |
|---|---|---|---|
| 2006/0072022 A1* | 4/2006 | Iwai | H04N 5/275 348/239 |
| 2007/0064275 A1 | 3/2007 | Ohk | |
| 2009/0003687 A1* | 1/2009 | Agarwal | G06T 7/0024 382/154 |
| 2009/0245571 A1* | 10/2009 | Chien | G06K 9/38 382/103 |
| 2011/0249190 A1* | 10/2011 | Nguyen | H04N 5/272 348/708 |
| 2011/0249883 A1* | 10/2011 | Can | G06K 9/0014 382/133 |
| 2012/0051631 A1* | 3/2012 | Nguyen | G06K 9/38 382/164 |
| 2013/0016097 A1* | 1/2013 | Coene | G06T 15/205 345/419 |
| 2013/0121563 A1 | 5/2013 | Chen et al. | |
| 2013/0142452 A1* | 6/2013 | Shionozaki | G06T 7/0065 382/284 |
| 2013/0243313 A1* | 9/2013 | Civit | G06T 5/002 382/164 |
| 2014/0072212 A1* | 3/2014 | Sorgi | G06T 7/0081 382/164 |
| 2014/0307056 A1* | 10/2014 | Collet Romea | H04N 13/0007 348/47 |
| 2015/0187076 A1* | 7/2015 | Lin | H04N 7/15 382/103 |

OTHER PUBLICATIONS

Foreign Communication From a Counterpart Application, European Application No. 14838494.4, Extended European Search Report dated May 25, 2016, 8 pages.

* cited by examiner

IMAGE PROCESSING METHOD AND DEVICE

CROSS-REFERENCE TO RELATED APPLICATIONS

This application is a continuation of International Application No. PCT/CN2014/070138, filed on Jan. 6, 2014, which claims priority to Chinese Patent Application No. 201310362321.1, filed on Aug. 19, 2013, both of which are hereby incorporated by reference in their entireties.

TECHNICAL FIELD

The present disclosure relates to the field of image data processing technologies, and in particular, to an image processing method and device.

BACKGROUND

An immersive conferencing system is typical of a next generation multimedia conferencing system, and the immersive conferencing system can provide more realistic and immersive user experience. Generally, new technologies such as high definition audio/video, stereophony, three dimensional (3D) video, and an augmented reality technology are applied to the immersive conferencing system to allow a user, when participating in a conference, to have immersive experience.

Generally, the immersive conferencing system includes two types of cameras. One type is a traditional color camera, which can capture a color image of a user, and the other type is a depth camera, which can capture a depth map of a distance between the user and the camera. Depth information captured by the depth information camera helps a lot in subsequent technical processing such as 3D image synthesis, skeleton identification, and tracing.

In an existing immersive conferencing system, when synthesis is performed on a video image of the conferencing system, an occupation rate of network bandwidth is relatively high.

SUMMARY

Embodiments of the present disclosure provide an image processing method and device to implement segmenting of images with different levels of user attention in a video image and use different encoding manners for segmented images, so that an occupation rate of network bandwidth in a video image transmission process can be lowered.

To resolve the foregoing technical problem, the embodiments of the present disclosure disclose the following technical solutions.

According to a first aspect, an image processing method is provided, including collecting a video image and a depth map of an object; segmenting, using the depth map, a video image frame corresponding to the video image at a same moment to obtain a contour of a foreground image in the video image frame; performing, according to the contour of the foreground image, first encoding on pixels of a video image inside the contour of the foreground image in the video image frame and second encoding on pixels of a video image outside the contour in the video image frame, to obtain encoded data corresponding to the video image frame, where an encoding rate of the first encoding is higher than an encoding rate of the second encoding; and outputting the encoded data corresponding to the video image frame and depth data corresponding to the contour of the foreground image.

With reference to the foregoing first aspect, in a first possible implementation manner, the segmenting, using the depth map, a video image frame corresponding to the video image at a same moment to obtain a contour of a foreground image in the video image frame include: performing pixel alignment on the depth map and the video image of the video image frame; calculating depth differences between each pixel and adjacent pixels on the depth map to determine a pixel from pixels as a segmentation point, where a variance of depth differences between the pixel and all adjacent pixels is greater than a preset threshold; traversing all pixels of the depth map to determine all segmentation points; and obtaining, according to all the segmentation points, the contour of the foreground image in the video image.

With reference to the foregoing first aspect, in a second possible implementation manner, the outputting depth data corresponding to the contour includes simplifying the depth map into a binary image according to the contour; and performing encoding processing on the binary image, and outputting encoded data corresponding to the binary image.

With reference to the foregoing first aspect and the first possible implementation manner, in a third possible implementation manner, the outputting depth data corresponding to the contour of the foreground image includes acquiring coordinate information of each segmentation point in all the segmentation points; and performing compression processing on all the coordinate information, and outputting compression data that is corresponding to all the coordinate information and obtained by means of the compression processing.

According to a second aspect, an image processing method is provided, including receiving encoded data of a video image frame and depth data corresponding to a contour of a foreground image in the video image frame, where in the video image frame, according to the contour of the foreground image, first encoding is performed on pixels of a video image inside the contour of the foreground image, and second encoding is performed on pixels of a video image outside the contour, to obtain the encoded data corresponding to the video image frame, and an encoding rate of the first encoding is higher than an encoding rate of the second encoding; segmenting, according to the depth data, the video image frame to obtain the foreground image in the video image frame; and playing the foreground image.

With reference to the foregoing second aspect, in a first possible implementation manner, the method further includes playing a preset background image or picture and using the background image or picture as a background of the foreground image, when the foreground image is played.

According to a third aspect, an image processing device is provided, including a collecting module configured to collect a video image and a depth map of an object; a contour segmenting module configured to segment, using the depth map, a video image frame corresponding to the video image at a same moment to obtain a contour of a foreground image in the video image frame; a video encoding module configured to perform, according to the contour of the foreground image, first encoding on pixels of a video image inside the contour of the foreground image in the video image frame and second encoding on pixels of a video image outside the contour in the video image frame, to obtain encoded data corresponding to the video image frame, where an encoding rate of the first encoding is higher than an encoding rate of the second encoding; a first output module configured to output the encoded data corresponding to the video image frame; and a second output module configured to output depth data corresponding to the contour of the foreground image.

With reference to the foregoing third aspect, in a first possible implementation manner, the contour segmenting module includes a pixel alignment unit configured to perform pixel alignment on the depth map and the video image of the video image frame; a depth difference calculation unit configured to calculate depth differences between each pixel and adjacent pixels on the depth map to determine a pixel from pixels as a segmentation point, where a variance of depth differences between the pixel and all adjacent pixels is greater than a preset threshold; a segmentation point determining unit configured to traverse all pixels of the depth map to determine all segmentation points; and a contour acquiring unit configured to obtain, according to all the segmentation points, the contour of the foreground image in the video image.

With reference to the foregoing third aspect, in a second possible implementation manner, the second output module includes a binary image simplifying unit configured to simplify the depth map into a binary image according to the contour; a binary image encoding unit configured to perform encoding processing on the binary image; and a binary image output unit configured to output encoded data corresponding to the binary image.

With reference to the foregoing third aspect and the first possible implementation manner, in a third possible implementation manner, the second output module includes a coordinate acquiring unit configured to acquire coordinate information of each segmentation point in all the segmentation points; a compression unit configured to perform compression processing on all the coordinate information; and a coordinate output unit configured to output compression data that is corresponding to all the coordinate information and obtained by means of the compression processing.

According to a fourth aspect, an image processing device is provided, including a receiving module configured to receive encoded data of a video image frame and depth data corresponding to a contour of a foreground image in the video image frame, where in the video image frame, according to the contour of the foreground image, first encoding is performed on pixels of a video image inside the contour of the foreground image, and second encoding is performed on pixels of a video image outside the contour, to obtain the encoded data corresponding to the video image frame, and an encoding rate of the first encoding is higher than an encoding rate of the second encoding; a foreground image segmentation module configured to segment, according to the depth data, the video image frame to obtain the foreground image in the video image frame; and a foreground play module configured to play the foreground image.

With reference to the foregoing fourth aspect, in a first possible implementation manner, the image processing device further includes a background play module configured to play a preset background image or picture and use the background image or picture as a background of the foreground image, when the foreground image is played.

According to a fifth aspect, an image processing system is provided, including the two image processing devices according to any one of the foregoing.

In the embodiments of the present disclosure, a contour of a foreground image in a video image frame is obtained by segmenting the video image frame; a "foreground" image and a "background" image in the video image frame can be distinguished from each other according to the contour of the foreground image; further, encoding processing in different manners is performed on pixels of a video image included in the "foreground" image and pixels of a video image included in the "background" image, that is, an encoding manner of a higher encoding rate is used for the "foreground" image inside the contour and an encoding manner of a lower encoding rate is used for the "background" image outside the contour. Using these encoding manners, a utilization rate of bits in an encoding process can be reduced, an occupation rate of network bandwidth in a video image frame transmission process can be lowered, and image quality of the "foreground" image can be improved. In addition, because only depth data of pixels corresponding to the contour, instead of depth data corresponding to all pixels in a depth map is transmitted, an occupation rate of network bandwidth in a video image transmission process can be further lowered.

BRIEF DESCRIPTION OF DRAWINGS

To describe the technical solutions in the embodiments of the present disclosure or in the prior art more clearly, the following briefly introduces the accompanying drawings required for describing the embodiments or the prior art. A person of ordinary skill in the art may still derive other drawings from these accompanying drawings without creative efforts.

DESCRIPTION OF EMBODIMENTS

To make a person skilled in the art understand the technical solutions in the embodiments of the present disclosure better, and make the objectives, features, and advantages of the embodiments of the present disclosure clearer, the following further describes the technical solutions in the embodiments of the present disclosure in detail with reference to the accompanying drawings.

First, an image processing method provided in the present disclosure is introduced. The image processing method, and an image processing device and system that are provided in the present disclosure may be applied to an immersive conferencing system.

Figure 1:
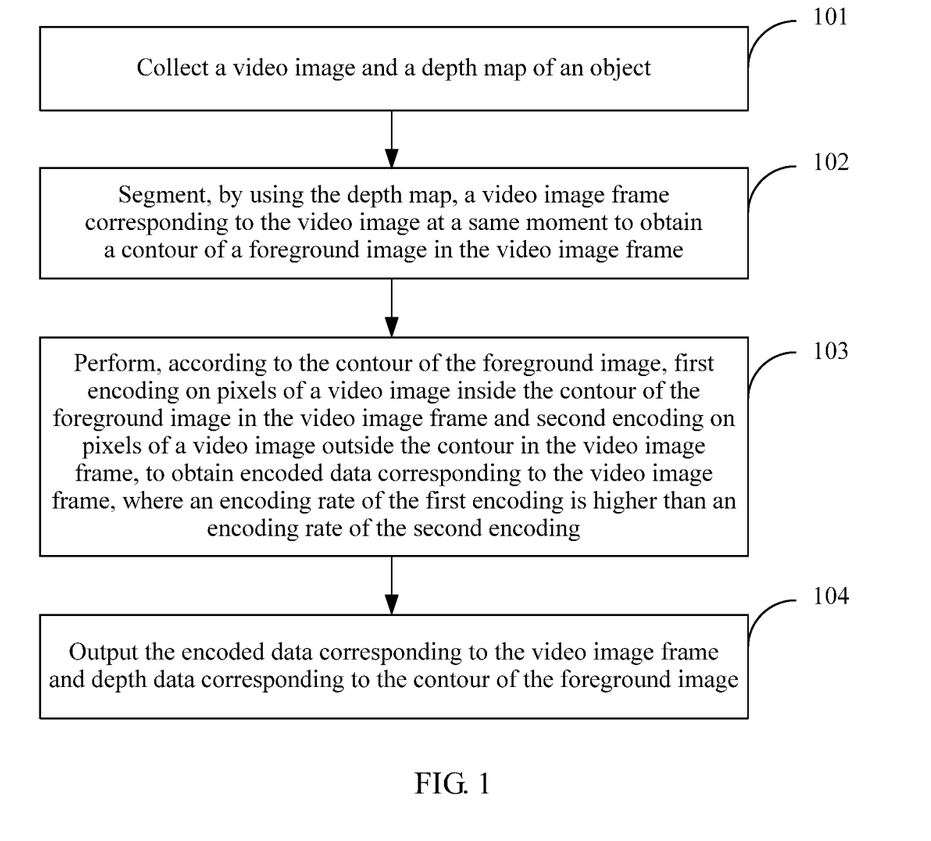
FIG. 1 is a flowchart of an embodiment of an image processing method according to the present disclosure.

Referring to FIG. 1, FIG. 1 is a flowchart of an embodiment of an image processing method according to the present disclosure, where the method may include:

Step 101: Collect a video image and a depth map of an object.

This embodiment describes the image processing method on the side for sending a video image. In this step, a color video image of a user may be captured using a color camera, and meanwhile, a depth map of a distance between the user and the camera may be captured using the depth camera.

Step 102: Segment, using the depth map, a video image frame corresponding to the video image at a same moment to obtain a contour of a foreground image in the video image frame.

The image processing method, device, and system provided in the present disclosure may be applied to an immersive conferencing system. For the immersive conferencing system, actually, a video image with a higher level of user attention is merely a part of an actually received video image. This part of the video image to which a user pays attention is referred to as "foreground", and another part of the video image to which the user pays less attention is referred to as "background". For example, in a general video conference, a user pays attention to all other persons who communicate with the user in a current system; therefore, an image of these persons is the "foreground"; and an image, to which the user does not pay attention, excluding these persons is the "background".

In the foregoing steps, the video image frame corresponding to the video image at a same moment is segmented using the depth map, and the contour of the foreground image in the video image frame is obtained using image segmentation. Using this segmenting manner, a contour of a foreground image in each video image frame may be obtained.

Using the contour of the foreground image, the "foreground" and "background" in the video image frame may be separated. In a range of pixels of the video image frame, all pixels inside the contour form a "foreground" image, and all pixels outside the contour form a "background" image.

Step 103: Perform, according to the contour of the foreground image, first encoding on pixels of a video image inside the contour of the foreground image in the video image frame and second encoding on pixels of a video image outside the contour in the video image frame, to obtain encoded data corresponding to the video image frame, where an encoding rate of the first encoding is higher than an encoding rate of the second encoding.

In this step, Region of Interest (ROI) encoding is performed on the video image frame using the contour of the foreground image. The performing encoding in different encoding manners on the pixels of the video image inside the contour of the foreground image in the video image frame and the pixels of the video image outside the contour of the foreground image in the video image frame includes an encoding manner of a higher encoding rate is used for the "foreground" image inside the contour of the foreground image in the video image and an encoding manner of a lower encoding rate is used for the "background" image outside the contour of the foreground image in the video image. Using these encoding manners, a utilization rate of bits in an encoding process can be reduced, an occupation rate of network bandwidth in a video image transmission process can be lowered, and image quality of the "foreground" image can be improved.

Step 104: Output the encoded data corresponding to the video image frame and depth data corresponding to the contour of the foreground image.

In this step, the encoded data corresponding to the video image frame and the depth data corresponding to the contour are output together; therefore, a receive end may obtain, according to the depth data corresponding to the contour of the foreground image, the contour that segments the "foreground" image and the "background" image in the video image frame, and further obtain, according to the contour of the foreground image, the "foreground" image in the video image frame from the video image frame obtained through decoding.

Because only the depth data of pixels corresponding to the contour of the foreground image, instead of depth data corresponding to all pixels in the depth map is transmitted, an occupation rate of network bandwidth in a video image transmission process can be further lowered.

In this embodiment of the present disclosure, a contour of a foreground image in a video image frame is obtained by segmenting the video image frame; a "foreground" image and a "background" image in the video image frame can be distinguished from each other according to the contour of the foreground image; further, encoding processing in different manners is performed on pixels of a video image included in the "foreground" image and pixels of a video image included in the "background" image, that is, an encoding manner of a higher encoding rate is used for the "foreground" image inside the contour and an encoding manner of a lower encoding rate is used for the "background" image outside the contour. Using these encoding manners, a utilization rate of bits in an encoding process can be reduced, an occupation rate of network bandwidth in a video image frame transmission process can be lowered, and image quality of the "foreground" image can be improved. In addition, because only depth data of pixels corresponding to the contour of the foreground image, instead of depth data corresponding to all pixels in a depth map is transmitted, an occupation rate of network bandwidth in a video image transmission process may be further lowered.

To facilitate understanding of the technical solution of the present disclosure, the following describes in detail the technical solution of the present disclosure using a specific implementation manner.

Figure 2:
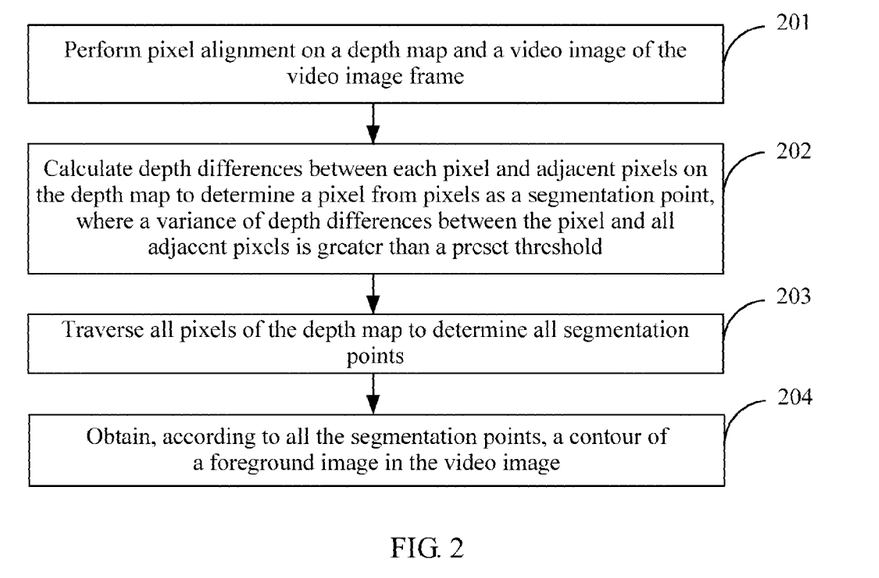
FIG. 2 is a flowchart of implementation of step 101 in FIG. 1.

During specific implementation, in the foregoing step 101, the video image frame corresponding to the video image at a same moment is segmented using the depth map to obtain the contour of the foreground image in the video image frame, where a specific implementation manner of this step is shown in FIG. 2, and may include the following execution steps:

Step 201: Perform pixel alignment on the depth map and the video image of the video image frame.

In this step, pixel alignment is performed on a depth map and a color image that are collected by a depth camera and a color camera at a same moment respectively.

When a resolution of the color image is higher than a resolution of the depth map, the resolution of the color image is downsampled to the resolution of the depth map; when a resolution of the color image is lower than a resolution of the depth map, the resolution of the color image is upsampled to the resolution of the depth map; or when a resolution of the color image is equal to a resolution of the depth map, processing does not need to be performed.

Step 202: Calculate depth differences between each pixel and adjacent pixels on the depth map to determine a pixel from pixels as a segmentation point, where a variance of depth differences between the pixel and all adjacent pixels is greater than a preset threshold.

In this step, the calculating depth differences between each pixel and the adjacent pixels on the depth map is generally calculating depth differences between each pixel and adjacent eight pixels on the depth map. A value of each pixel on a depth map is actually a projected coordinate of a spatial point, which indicates that a distance from the spatial point to a plane on which a depth sensor is located is Z, where a unit is mm. Inconsecutive points, that is, segmentation points, on the depth map may be extracted by calculating these depth differences.

For a pixel, when there is an obvious distinction between one or multiple depth differences among the calculated eight depth differences and remaining depth differences, that is, when a variance of the eight depth differences is greater than a particular preset threshold, the pixel may be determined as a segmentation point.

Step 203: Traverse all pixels of the depth map to determine all segmentation points.

In this step, the foregoing calculation of depth differences between each pixels and adjacent pixels is sequentially performed on each pixel of the depth map to determine all the segmentation points.

Step 204: Obtain, according to all the segmentation points, the contour of the foreground image in the video image.

In this step, when all the segmentation points are determined, the contour that distinguishes the "foreground" image from the "background" image in the video image can be formed after all the segmentation points are connected.

In this embodiment of the present disclosure, in a process of transmitting the video image frame to the receive end, the depth data corresponding to the contour also needs to be transmitted. For outputting the depth data corresponding to the contour, this embodiment of the present disclosure provides the following two processing methods:

In a first method, the depth map is simplified into a binary image according to the contour; encoding processing is performed on the binary image, and encoded data corresponding to the binary image is output.

In this manner, values of all the pixels inside the contour are set to 0 and values of all the pixels outside the contour are set to 1.

During outputting, encoding processing is performed on the depth map that is simplified into the binary image; further, code streams, separately processed by means of encoding, of the binary image and the color image are outputted, and are transmitted through a transmission network to the receive end for watching the video image.

In addition, when encoding is performed on the binary image, a JBIG2 encoder may be applied.

In a second method, coordinate information of each segmentation point in all the segmentation points is acquired; compression processing is performed on all the coordinate information, and compression data that is corresponding to all the coordinate information and obtained by means of the compression processing is output.

In this manner, coordinate information of all segmentation points is acquired, including spatial coordinates or vector coordinates of pixels corresponding to the segmentation points, and the spatial coordinates are, for example, coordinates of (x, y). Then, the coordinate information of all the segmentation points is put together, and indicates, for example, a dataset. Compression is performed on the dataset including the coordinate information of all the segmentation points, and the compressed dataset is transmitted through a transmission network to a receive end for watching the video image.

The foregoing embodiment mainly describes the image processing method on the side for sending an image in an image processing process. Correspondingly, the present disclosure further provides an image processing method, which is an image processing method on the side for receiving an image in an image processing process.

Figure 3:
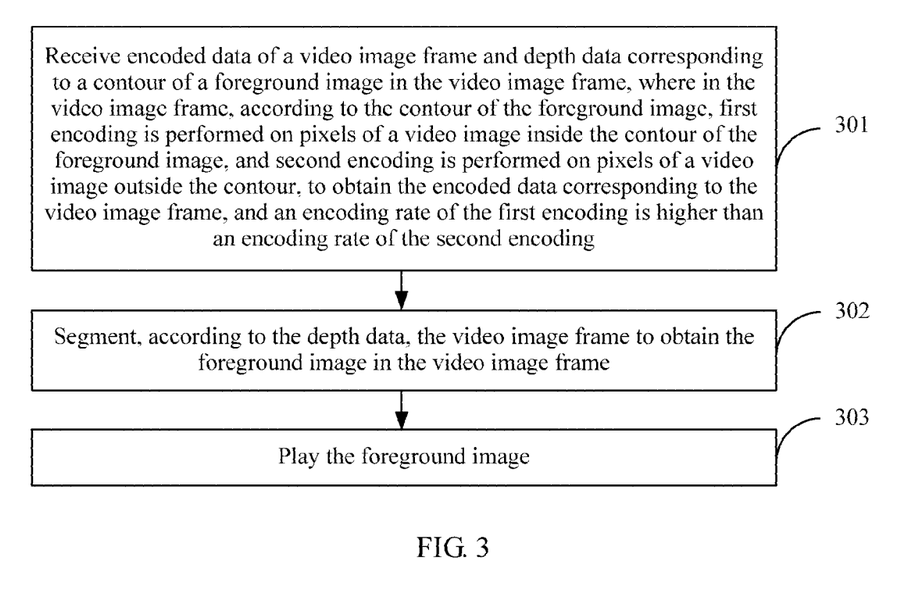
FIG. 3 is a flowchart of an embodiment of another image processing method according to the present disclosure.

Referring to FIG. 3, FIG. 3 is a flowchart of an embodiment of an image processing method according to the present disclosure, where the method may include:

Step 301: Receive encoded data of a video image frame and depth data corresponding to a contour of a foreground image in the video image frame, where in the video image frame, according to the contour of the foreground image, first encoding is performed on pixels of a video image inside the contour of the foreground image, and second encoding is performed on pixels of a video image outside the contour, to obtain the encoded data corresponding to the video image frame, and an encoding rate of the first encoding is higher than an encoding rate of the second encoding.

In this step, the receiving side receives the encoded data corresponding to the video image frame and the depth data corresponding to the contour of the foreground image in the video image frame that are sent by the sending side. The side for sending a video image has obtained, by means of image segmentation, the contour of the foreground image in the video image frame and separated, in the video image frame, "foreground" from "background" using the contour. In the video image frame, all pixels inside the contour form a "foreground" image, and all pixels outside the contour form a "background" image.

In addition, in the encoded data, received by the receiving side, corresponding to the video image frame, the side for sending a video image has used an encoding manner of a higher encoding rate for the "foreground" image inside the contour of the foreground image in the video image frame and has used an encoding manner of a lower encoding rate for the "background" image outside the contour of the foreground image in the video image frame. Using these encoding manners, a utilization rate of bits in an encoding process can be reduced, an occupation rate of network bandwidth in a video image transmission process can be lowered, and image quality of the "foreground" image can be improved.

Step 302: Segment, according to the depth data, the video image frame to obtain the foreground image in the video image frame.

In this step, the receiving side may perform decoding on the received encoded data to obtain a video image collected by the sending side and may segment the received video image according to the received depth data to further obtain the foreground image in the received video image. Generally, this part of foreground image is an image part to which a video user pays more attention.

Step 303: Play the foreground image.

In this step, after the foreground image in the video image is segmented, the foreground image may be played. In most cases, a user does not pay attention to a background image, except the foreground image, in the received video image, and this part of background image may be not played.

For example, in a general video conference, a user pays attention to all other persons who communicate with the user in a current system; therefore, an image of these persons is the "foreground"; and an image, to which the user does not pay attention, excluding these persons is the "background". According to this embodiment of the present disclosure, on the side for receiving a video, only the image, to which the user pays more attention, of these persons who communicate with the user in the current system is played; however, the "background" image, to which the user does not pay attention, excluding these persons is not played.

For an immersive conferencing system, when the foreground image is played, the foreground image may be arranged, for play, on a playback window on a conference interface in the video conferencing system.

In this embodiment of the present disclosure, the side for sending a video image obtains a contour of a foreground image in a video image frame by segmenting the video image frame, can distinguish a "foreground" image from a "background" image in the video image frame according to the contour of the foreground image, and further, performs encoding processing in different manners on pixels of a video image included in the "foreground" image and pixels of a video image included in the "background" image, that is, an encoding manner of a higher encoding rate is used for the "foreground" image inside the contour and an encoding manner of a lower encoding rate is used for the "background" image outside the contour. Using these encoding manners, a utilization rate of bits in an encoding process can be reduced, an occupation rate of network bandwidth in a video image frame transmission process can be lowered, and image quality of the "foreground" image can be improved. In addition, because only depth data of pixels corresponding to the contour of the foreground image, instead of depth data corresponding to all pixels in a depth map is transmitted, an occupation rate of network bandwidth in a video image transmission process may be further lowered.

In most cases, a user does not pay attention to a background image, except the foreground image, in the received video image. To improve immersive experience of the user when the user participates in a video conference, this part of background image may be not played; instead, when the foreground image is played, a preset background image or picture is played and the background image or picture is used as a background of the foreground image. For example, on a conference interface of an immersive conferencing system, a human image of a counterpart user who communicates with a user in a current system is generally a "foreground" image. When this part of "foreground" image is played, a preset background image or picture may be played, and the preset background image or picture is used as a "background" image of the conference interface and is played together with the human image, played on the conference interface, of the counterpart user.

Corresponding to the embodiments of the image processing method provided in the present disclosure, the present disclosure further provides an image processing device.

Figure 4:
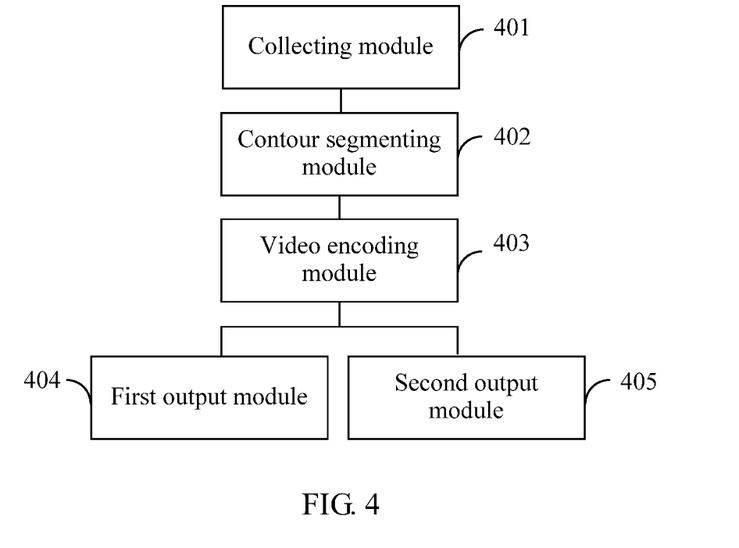
FIG. 4 is a structural block diagram of an embodiment of an image processing device according to the present disclosure.

As shown in FIG. 4, FIG. 4 is an embodiment of an image processing device provided in the present disclosure, and the device may include a collecting module 401 configured to collect a video image and a depth map of an object; a contour segmenting module 402 configured to segment, using the depth map, a video image frame corresponding to the video image at a same moment to obtain a contour of a foreground image in the video image frame; a video encoding module 403 configured to perform, according to the contour of the foreground image, first encoding on pixels of a video image inside the contour of the foreground image in the video image frame and second encoding on pixels of a video image outside the contour in the video image frame, to obtain encoded data corresponding to the video image frame, where an encoding rate of the first encoding is higher than an encoding rate of the second encoding; a first output module 404 configured to output the encoded data corresponding to the video image frame; and a second output module 405 configured to output depth data corresponding to the contour of the foreground image.

In this embodiment of the present disclosure, a video image and a depth map of an object are collected using a collecting module; a video image frame is segmented using a contour segmenting module in an image processing device to obtain a contour of a foreground image in the video image frame; a "foreground" image and a "background" image in the video image frame are distinguished from each other according to the contour; further, encoding processing in different manners is performed, using a video encoding module, on pixels of a video image included in the "foreground" image and pixels of a video image included in the "background" image, that is, an encoding manner of a higher encoding rate is used for the "foreground" image inside the contour and an encoding manner of a lower encoding rate is used for the "background" image outside the contour. Using these encoding manners, a utilization rate of bits in an encoding process can be reduced, an occupation rate of network bandwidth in a video image transmission process can be lowered, and image quality of the "foreground" image can be improved. In addition, because only depth data of pixels corresponding to the contour of the foreground image, instead of depth data corresponding to all pixels in the depth map is transmitted, an occupation rate of network bandwidth in a video image transmission process may be further lowered.

Figure 5:
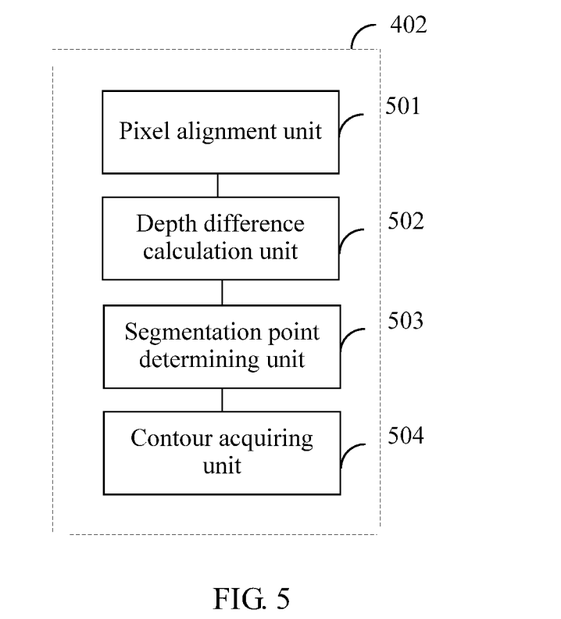
FIG. 5 is a structural block diagram of a contour segmenting module in FIG. 4.

In a feasible embodiment provided in the present disclosure, as shown in FIG. 5, the contour segmenting module 402 may include a pixel alignment unit 501 configured to perform pixel alignment on the depth map and the video image of the video image frame; a depth difference calculation unit 502 configured to calculate depth differences between each pixel and adjacent pixels on the depth map to determine a pixel from pixels as a segmentation point, where a variance of depth differences between the pixel and all adjacent pixels is greater than a preset threshold; a segmentation point determining unit 503 configured to traverse all pixels of the depth map to determine all segmentation points; and a contour acquiring unit 504 configured to obtain, according to all the segmentation points, the contour of the foreground image in the video image.

Figure 6:
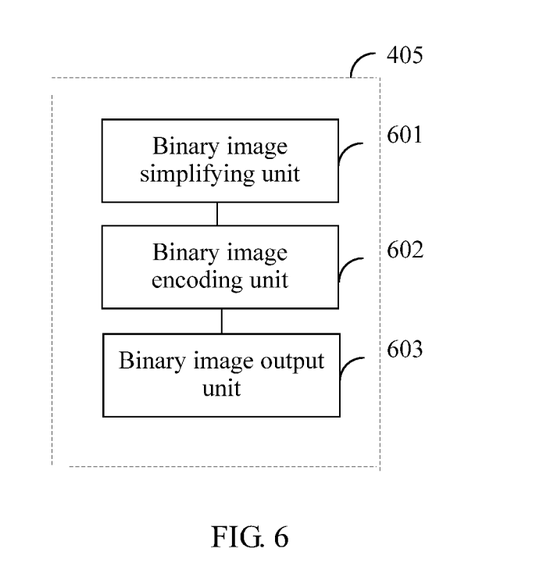
FIG. 6 is a structural block diagram of a second output module 405 in FIG. 4.

In a feasible embodiment provided in the present disclosure, as shown in FIG. 6, the second output module 405 may include a binary image simplifying unit 601 configured to simplify the depth map into a binary image according to the contour; a binary image encoding unit 602 configured to perform encoding processing on the binary image; and a binary image output unit 603 configured to output encoded data corresponding to the binary image.

In this implementation manner, values of all the pixels inside the contour are set to 0 and values of all the pixels outside the contour are set to 1. During outputting, encoding processing is performed on the depth map that is simplified into the binary image; further, code streams, separately processed by means of encoding, of the binary image and a color image are outputted, and are transmitted through a transmission network to a receive end for watching the video image.

Figure 7:
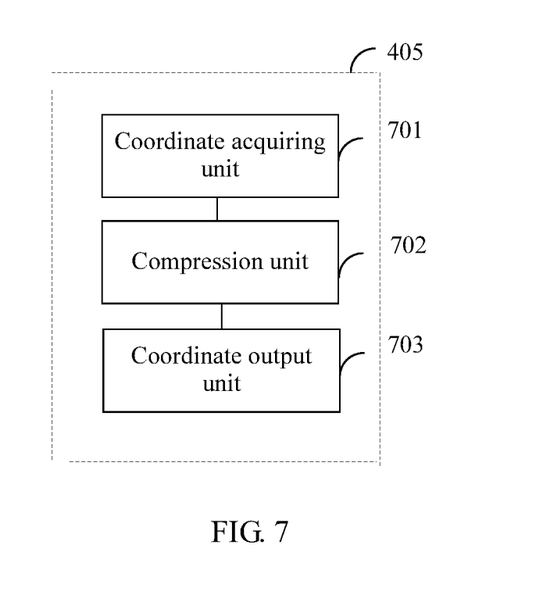
FIG. 7 is another structural block diagram of a second output module 405 in FIG. 4.

In another feasible embodiment provided in the present disclosure, as shown in FIG. 7, the second output module 405 may include a coordinate acquiring unit 701 configured to acquire coordinate information of each segmentation point in all the segmentation points; a compression unit 702 configured to perform compression processing on all the coordinate information; and a coordinate output unit 703 configured to output compression data that is corresponding to all the coordinate information and obtained by means of the compression processing.

In this implementation manner, coordinate information of all segmentation points is acquired, including spatial coordinates or vector coordinates of pixels corresponding to the segmentation points, and the spatial coordinates are, for example, coordinates of (x, y). Then, the coordinate information of all the segmentation points is put together, and indicates, for example, a dataset. Compression is performed on the dataset including the coordinate information of all the segmentation points, and the compressed dataset is transmitted through a transmission network to a receive end for watching the video image.

The foregoing image processing device is a corresponding device on the side for sending an image in an image processing process. In this embodiment of the present disclosure, an image processing device is provided, where the image processing device is a corresponding device on the side for receiving an image in an image processing process.

Figure 8:
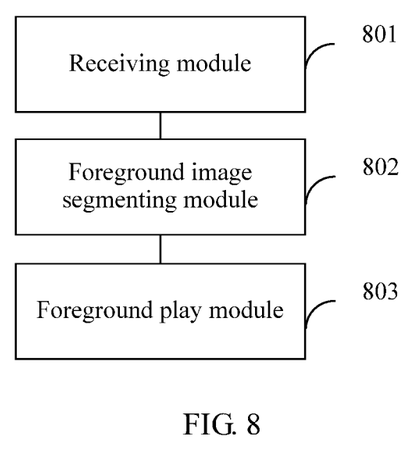
FIG. 8 is a structural block diagram of an embodiment of another image processing device according to the present disclosure.

As shown in FIG. 8, FIG. 8 is an embodiment of an image processing device provided in the present disclosure, and the device may include a receiving module 801 configured to receive encoded data of a video image frame and depth data corresponding to a contour of a foreground image in the video image frame, where in the video image frame, according to the contour of the foreground image, first encoding is performed on pixels of a video image inside the contour of the foreground image, and second encoding is performed on pixels of a video image outside the contour, to obtain the encoded data corresponding to the video image frame, and an encoding rate of the first encoding is higher than an encoding rate of the second encoding; a foreground image segmentation module 802 configured to segment the video image frame to obtain the foreground image in the video image frame; and a foreground play module 803 configured to play the foreground image.

In this embodiment of the present disclosure, the side for sending a video image obtains a contour of a foreground image in a video image frame by segmenting the video image frame, can distinguish a "foreground" image from a "background" image in the video image frame according to the contour of the foreground image, and further, performs encoding processing in different manners on pixels of a video image included in the "foreground" image and pixels of a video image included in the "background" image, that is, an encoding manner of a higher encoding rate is used for the "foreground" image inside the contour and an encoding manner of a lower encoding rate is used for the "background" image outside the contour. Using these encoding manners, a utilization rate of bits in an encoding process can be reduced, an occupation rate of network bandwidth in a video image frame transmission process can be lowered, and image quality of the "foreground" image can be improved. In addition, because only depth data of pixels corresponding to the contour of the foreground image, instead of depth data corresponding to all pixels in the depth map is transmitted, an occupation rate of network bandwidth in a video image transmission process may be further lowered.

Figure 9:
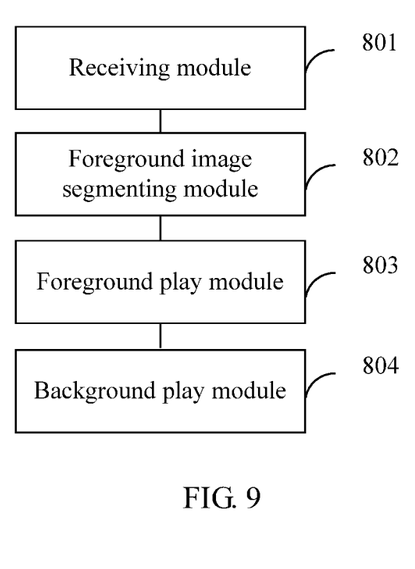
FIG. 9 is a structural block diagram of an embodiment of still another image processing device according to the present disclosure.

In another embodiment provided in the present disclosure, as shown in FIG. 9, the image processing device may further include a background play module 804 configured to play a preset background image or picture and use the background image or picture as a background of the foreground image, when the foreground image is played.

In most cases, a user does not pay attention to a background image, except the foreground image, in the received video image. To improve immersive experience of the user when the user participates in a video conference, in this embodiment of the present disclosure, this part of background image may not be played; instead, when the foreground image is played, a preset background image or picture is played, and the background image or picture is used as the background of the foreground image.

Correspondingly, the present disclosure further provides an image processing system. The system may include an image sending device and an image receiving device.

The image sending device is configured to collect a video image and a depth map of an object; segment, using the depth map, a video image frame corresponding to the video image at a same moment to obtain a contour of a foreground image in the video image frame; perform, according to the contour of the foreground image, first encoding on pixels of a video image inside the contour of the foreground image in the video image frame and second encoding on pixels of a video image outside the contour in the video image frame, to obtain encoded data corresponding to the video image frame, where an encoding rate of the first encoding is higher than an encoding rate of the second encoding; and output the encoded data corresponding to the video image frame and depth data corresponding to the contour of the foreground image.

The image receiving device is configured to receive the encoded data of the video image frame and the depth data corresponding to the contour of the foreground image in the video image frame; segment, according to the depth data, the video image frame to obtain the foreground image in the video image frame; and play the foreground image.

In the foregoing system embodiment, on the side of the image sending device, a contour of a foreground image in a video image frame is obtained by segmenting the video image frame; a "foreground" image and a "background" image in the video image frame can be distinguished from each other according to the contour of the foreground image; further, encoding processing in different manners is performed on pixels of a video image included in the "foreground" image and pixels of a video image included in the "background" image, that is, an encoding manner of a higher encoding rate is used for the "foreground" image inside the contour and an encoding manner of a lower encoding rate is used for the "background" image outside the contour. Using these encoding manners, a utilization rate of bits in an encoding process can be reduced, an occupation rate of network bandwidth in a video image frame transmission process can be lowered, and image quality of the "foreground" image can be improved. In addition, because only depth data of pixels corresponding to the contour of the foreground image, instead of depth data corresponding to all pixels in the depth map is transmitted, an occupation rate of network bandwidth in a video image transmission process may be further lowered.

In addition, in the foregoing system, the image sending device may further execute the execution procedure shown in FIG. 2 and the foregoing two processing methods for outputting the depth data corresponding to the contour. The image receiving device may further execute the execution procedure shown in FIG. 3, and can play a preset background image or picture and use the background image or picture as a background of the foreground image when the foreground image is played.

The following elaborates the foregoing technical solutions using a specific application scenario.

Figure 10:
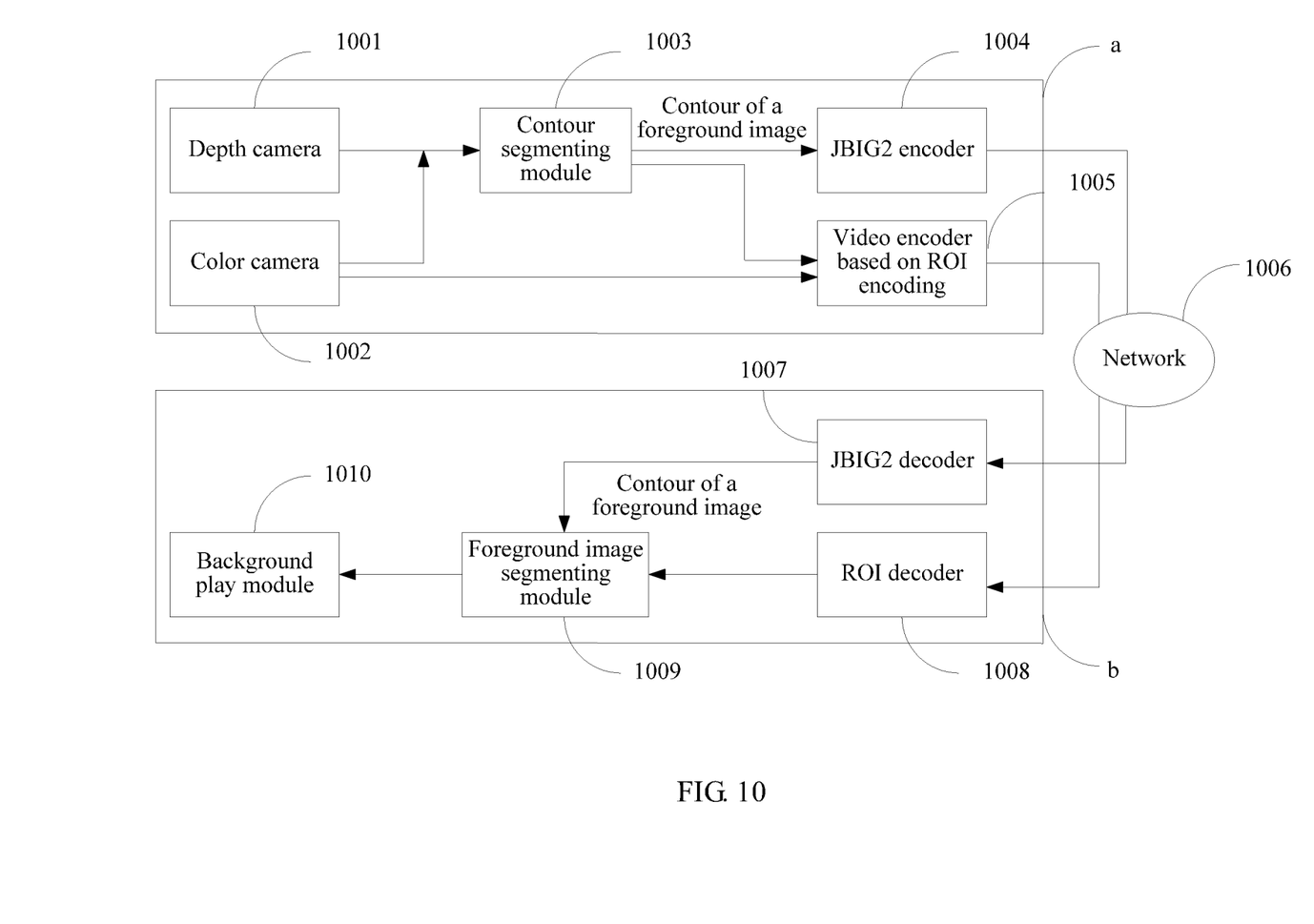
FIG. 10 is a specific application scenario according to the present disclosure.

In an application scenario shown in FIG. 10, a depth camera 1001 on the side "a" of an image sending device is configured to capture a depth map of a distance between a user and a camera, and a color camera 1002 is configured to capture a color video image of the user to obtain a video image frame of a current video image; a contour segmenting module 1003 is configured to segment the video image frame using the depth map to obtain a contour of a foreground image in the video image frame; the depth map is simplified into a binary image according to the contour, and encoding processing is performed on the binary image using a JBIG2 encoder 1004; meanwhile, ROI encoding on the video image frame using the contour of the foreground image is implemented using an ROI encoding-based video encoder 1005. Two types of encoded data are transmitted through a network 1006 to a JBIG2 decoder 1007 and an ROI decoder 1008 on the side "b" of an image receiving device. The contour of the foreground image in the video image frame is obtained using the JBIG2 decoder; further, the foreground image in the video image frame is separately segmented using a foreground image segmentation module 1009; furthermore, a background play module 1010 is configured to implement that when the foreground image is played, a preset background image or picture is played and used as a background of the foreground image.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, device, and unit, reference may be made to a corresponding process in the foregoing method embodiments, and details are not described herein again.

In the several embodiments provided in the present application, it should be understood that the disclosed system, device, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An image processing method, being carried out by an image processing device having a processor executing computer-executable instructions, the method comprising:
   collecting a video image and a depth map of an object;
   segmenting, using the depth map, a video image frame corresponding to the video image at a same moment to obtain a contour of a foreground image in the video image frame, which comprises:
      performing pixel alignment on the depth map and the video image of the video image frame;
      calculating depth differences between each pixel and adjacent pixels on the depth map to determine a pixel from pixels as a segmentation point, wherein a variance of depth differences between the pixel and all adjacent pixels is greater than a preset threshold;
      traversing all pixels of the depth map to determine all segmentation points; and
      obtaining, according to all the segmentation points, the contour of the foreground image in the video image frame;
   performing, according to the contour of the foreground image, first encoding on pixels of a video image inside the contour of the foreground image in the video image frame and second encoding on pixels of a video image outside the contour in the video image frame, to obtain encoded data corresponding to the video image frame, wherein an encoding rate of the first encoding is higher than an encoding rate of the second encoding; and
   outputting the encoded data corresponding to the video image frame and depth data corresponding to the contour of the foreground image.

2. The method according to claim 1, wherein outputting the depth data corresponding to the contour of the foreground image comprises:
   simplifying the depth map into a binary image according to the contour;
   performing encoding processing on the binary image; and
   outputting encoded data corresponding to the binary image.

3. The method according to claim 1, wherein outputting the depth data corresponding to the contour of the foreground image comprises:
   acquiring coordinate information of each segmentation point in all the segmentation points;
   performing compression processing on all the coordinate information; and
   outputting compression data that is corresponding to all the coordinate information and obtained by means of the compression processing.

4. An image processing method being carried out by an image processing device having a processor executing computer-executable instructions, the method comprising:
   receiving encoded data of a video image frame and depth data corresponding to a contour of a foreground image in the video image frame, wherein in the video image frame, according to the contour of the foreground image, first encoding is performed on pixels of a video image inside the contour of the foreground image, and second encoding is performed on pixels of a video image outside the contour, to obtain the encoded data corresponding to the video image frame, and wherein an encoding rate of the first encoding is higher than an encoding rate of the second encoding;

segmenting, according to the depth data, the video image frame to obtain the foreground image in the video image frame, which comprises:
performing pixel alignment on the depth map and the video image of the video image frame;
calculating depth differences between each pixel and adjacent pixels on the depth map to determine a pixel from pixels as a segmentation point, wherein a variance of depth differences between the pixel and all adjacent pixels is greater than a preset threshold;
traversing all pixels of the depth map to determine all segmentation points; and
obtaining, according to all the segmentation points, the contour of the foreground image in the video image frame; and playing the foreground image.

5. The method according to claim 4, further comprising playing a preset background image or picture and using the preset background image or picture as a background of the foreground image when the foreground image is played.

6. An image processing device, comprising:
a memory storage device comprising computer-executable instructions; and
a processor, wherein the computer-executable instructions cause the processor to be configured to:
collect a video image and a depth map of an object;
segment, using the depth map, a video image frame corresponding to the video image at a same moment to obtain a contour of a foreground image in the video image frame, which comprises:
performing pixel alignment on the depth map and the video image of the video image frame;
calculating depth differences between each pixel and adjacent pixels on the depth map to determine a pixel from pixels as a segmentation point, wherein a variance of depth differences between the pixel and all adjacent pixels is greater than a preset threshold;
traversing all pixels of the depth map to determine all segmentation points; and
obtaining, according to all the segmentation points, the contour of the foreground image in the video image frame;
perform, according to the contour of the foreground image, first encoding on pixels of a video image inside the contour of the foreground image in the video image frame and second encoding on pixels of a video image outside the contour in the video image frame, to obtain encoded data corresponding to the video image frame, wherein an encoding rate of the first encoding is higher than an encoding rate of the second encoding;
output the encoded data corresponding to the video image frame; and
output depth data corresponding to the contour of the foreground image.

7. The image processing device according to claim 6, wherein the computer-executable instructions further cause the processor to be configured to:
simplify the depth map into a binary image according to the contour;
perform encoding processing on the binary image; and
output encoded data corresponding to the binary image.

8. The image processing device according to claim 6, wherein the computer-executable instructions further cause the processor to be configured to:
acquire coordinate information of each segmentation point in all the segmentation points;
perform compression processing on all the coordinate information; and
output compression data that is corresponding to all the coordinate information and obtained by means of the compression processing.

9. An image processing device, comprising:
a receiver configured to receive encoded data of a video image frame and depth data corresponding to a contour of a foreground image in the video image frame, wherein in the video image frame, according to the contour of the foreground image, first encoding is performed on pixels of a video image inside the contour of the foreground image, and second encoding is performed on pixels of a video image outside the contour, to obtain the encoded data corresponding to the video image frame, and wherein an encoding rate of the first encoding is higher than an encoding rate of the second encoding; and
a processor coupled to the receiver and configured to:
segment, according to the depth data, the video image frame to obtain the foreground image in the video image frame, which comprises:
performing pixel alignment on the depth map and the video image of the video image frame;
calculating depth differences between each pixel and adjacent pixels on the depth map to determine a pixel from pixels as a segmentation point, wherein a variance of depth differences between the pixel and all adjacent pixels is greater than a preset threshold;
traversing all pixels of the depth map to determine all segmentation points; and
obtaining, according to all the segmentation points, the contour of the foreground image in the video image frame; and
play the foreground image.

10. The image processing device according to claim 9, wherein the processor is further configured to play a preset background image or picture and use the preset background image or picture as a background of the foreground image when the foreground image is played.

11. An image processing system, comprising:
a first image processing device comprising a first processor configured to:
collect a video image and a depth map of an object;
segment, by using the depth map, a video image frame corresponding to the video image at a same moment to obtain a contour of a foreground image in the video image frame;
perform, according to the contour of the foreground image, first encoding on pixels of a video image inside the contour of the foreground image in the video image frame and second encoding on pixels of a video image outside the contour in the video image frame, to obtain encoded data corresponding to the video image frame, wherein an encoding rate of the first encoding is higher than an encoding rate of the second encoding;

output the encoded data corresponding to the video image frame; and output depth data corresponding to the contour of the foreground image; and a second image processing device comprising:

a receiver configured to receive encoded data of a video image frame and depth data corresponding to a contour of a foreground image in the video image frame, wherein in the video image frame, according to the contour of the foreground image, first encoding is performed on pixels of a video image inside the contour of the foreground image, and second encoding is performed on pixels of a video image outside the contour, to obtain the encoded data corresponding to the video image frame, and wherein an encoding rate of the first encoding is higher than an encoding rate of the second encoding; and a second processor coupled to the receiver and configured to:

segment, according to the depth data, the video image frame to obtain the foreground image in the video image frame; and play the foreground image.

* * * * *